(12) United States Patent
Lu et al.

(10) Patent No.: US 9,352,731 B2
(45) Date of Patent: *May 31, 2016

(54) VEHICLE STABILITY CONTROL SYSTEM AND METHOD

(71) Applicant: FORD GLOBAL TECHNOLOGIES, LLC, Dearborn, MI (US)

(72) Inventors: Jianbo Lu, Livonia, MI (US); Leonard K. Johnson, Ann Arbor, MI (US); Joseph Carr Meyers, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/012,797

(22) Filed: Aug. 28, 2013

(65) Prior Publication Data

US 2014/0012477 A1  Jan. 9, 2014

Related U.S. Application Data

(62) Division of application No. 13/368,875, filed on Feb. 8, 2012, now Pat. No. 8,532,906, which is a division of application No. 12/018,249, filed on Jan. 23, 2008, now abandoned.

(51) Int. Cl.
*B60T 8/1755* (2006.01)
*B60K 31/00* (2006.01)
(Continued)

(52) U.S. Cl.
CPC .............. *B60T 8/1755* (2013.01); *B60K 31/00* (2013.01); *B60T 7/12* (2013.01); *B60T 8/17551* (2013.01);
(Continued)

(58) Field of Classification Search
CPC .................. B60W 10/04–10/08; B60W 10/18; B60W 30/00–30/045; B60W 50/0098; B60W 30/18118; B60W 40/10–40/114; B60W 2520/105; B60W 2520/125; B60W 2520/14–2520/20; B60W 2550/14–2550/145; B60T 8/175–8/1761; B60T 8/24–8/246; B60T 8/32–8/321; B60T 8/4809; B60T 2201/04–2201/06; B60T 2210/00–2210/10; B60T 2210/20; B60T 2230/00–2230/04; B60T 2250/00; B60T 2250/03; B60T 2270/10; B60T 2270/20; B60T 2270/30; B60T 2270/303; B60T 2270/313; B60G 2400/05–2400/0513; B60G 2400/052–2400/1062; B60G 2800/012–2800/0194; B60G 2800/21; B60G 2800/22; B60G 2800/215; B60G 2800/91–2800/9124; B60G 2800/92–2800/922; B60G 2800/93; B60G 2800/965; B60R 16/0232–16/0233

See application file for complete search history.

(56) References Cited

U.S. PATENT DOCUMENTS 3,998,411 A  12/1976  Blechen
4,603,582 A   8/1986  Middleton
(Continued)

OTHER PUBLICATIONS

Acceleration_VelTime Derivative.pdf (http://dictionary.reference.com/browse/acceleration, Feb. 7, 2013, pp. 1-4).
(Continued)

*Primary Examiner* — Bao Long T Nguyen
(74) *Attorney, Agent, or Firm* — Jones Robb, PLLC; Raymond L. Coppiellie

(57) ABSTRACT

A vehicle stability control system comprises a 5-sensor cluster and a stability controller configured to communicate with the 5-sensor cluster and receive signals corresponding to a lateral acceleration, a longitudinal acceleration, a yaw rate, a roll rate, and a pitch rate from the 5-sensor cluster. The stability controller can also be configured to determine a braking amount or a throttle amount to maintain vehicle stability. The system also comprises a brake controller configured to communicate with the stability controller and receive a braking request from the stability controller, and a throttle controller configured to communicate with the stability controller and receive a throttle request from the stability controller. The system may also comprise a braking or throttling command computed based on various scenarios detected by measured and calculated signals.

14 Claims, 3 Drawing Sheets

(51) Int. Cl.
*B60W 10/06* (2006.01)
*B60W 10/184* (2012.01)
*B60W 30/18* (2012.01)
*B60T 7/12* (2006.01)

(52) U.S. Cl.
CPC ............ *B60W 10/06* (2013.01); *B60W 10/184* (2013.01); *B60W 30/18118* (2013.01); *B60T 2201/04* (2013.01); *B60T 2201/06* (2013.01); *B60T 2230/02* (2013.01); *B60W 2510/0225* (2013.01); *B60W 2510/0604* (2013.01); *B60W 2510/1005* (2013.01); *B60W 2510/186* (2013.01); *B60W 2520/10* (2013.01); *B60W 2520/105* (2013.01); *B60W 2520/125* (2013.01); *B60W 2520/14* (2013.01); *B60W 2520/28* (2013.01); *B60W 2540/12* (2013.01); *B60W 2550/142* (2013.01); *B60W 2710/0677* (2013.01)

(56) References Cited

U.S. PATENT DOCUMENTS

| | | |
|---|---|---|
| 4,924,397 A | 5/1990 | Kurihara et al. |
| 5,769,752 A | 6/1998 | Kim |
| 5,941,608 A | 8/1999 | Campau et al. |
| 6,006,848 A | 12/1999 | Boehringer et al. |
| 6,533,366 B1 | 3/2003 | Barron et al. |
| 6,556,908 B1 | 4/2003 | Lu et al. |
| 6,616,572 B2 | 9/2003 | Suzuki |
| 6,748,311 B1 | 6/2004 | Walenty et al. |
| 6,847,875 B2 | 1/2005 | Lu et al. |
| 6,915,193 B2 | 7/2005 | Lu et al. |
| 6,915,201 B1 | 7/2005 | Ott |
| 7,000,998 B2 | 2/2006 | Hano et al. |
| 7,222,007 B2 | 5/2007 | Xu et al. |
| 7,239,949 B2 | 7/2007 | Lu et al. |
| 7,908,071 B2 * | 3/2011 | Nakayama ............... B60T 7/122 180/282 |
| 2004/0024513 A1 | 2/2004 | Aizawa et al. |
| 2005/0017580 A1 | 1/2005 | Cikanek et al. |
| 2005/0127746 A1 | 6/2005 | Braschel |
| 2005/0231033 A1 | 10/2005 | Ganzel |
| 2005/0278107 A1 | 12/2005 | Disser et al. |
| 2007/0067085 A1 * | 3/2007 | Lu ........................... B60T 8/175 701/70 |
| 2007/0192003 A1 * | 8/2007 | Hashiba ............... B60G 17/018 701/37 |
| 2008/0227598 A1 * | 9/2008 | Sigmund ............... B60W 10/06 477/92 |

OTHER PUBLICATIONS

Office Action dated Mar. 29, 2011 from U.S. Appl. No. 12/018,249.
Response to Office Action dated Mar. 29, 2011 from U.S. Appl. No. 12/018,249.
Office Action dated Sep. 8, 2011 from U.S. Appl. No. 12/018,249.
Office Action dated Sep. 13, 2012 from U.S. Appl. No. 13/368,875.
Response to Office Action dated Sep. 13, 2012 from U.S. Appl. No. 13/368,875.
Office Action dated Feb. 15, 2013 from U.S. Appl. No. 13/368,875.
Response to Office Action dated Feb. 15, 2013 from U.S. Appl. No. 13/368,875.
Notice of Allowance dated May 8, 2013 from U.S. Appl. No. 13/368,875.

* cited by examiner

VEHICLE STABILITY CONTROL SYSTEM AND METHOD

This is a divisional application of application Ser. No. 13/368,875, filed Feb. 2, 2012, which is a divisional application of application Ser. No. 12/018,249, filed Jan. 23, 2008 (now abandoned), the entire contents of each of which is incorporated by reference herein.

FIELD

The present invention relates generally to a motor vehicle stability control system that provides functions such as, for example, hill hold control, hill descent control, and other stability features such as maintaining a driver's desired velocity on inclines and declines, and reducing a vehicle's kinematic energy when the vehicle loses control.

INTRODUCTION

Many vehicle stability controls now include electronic stability control (ESC) and roll stability control (RSC) functions. The former is intended to control a vehicle's yaw motion and certain sideslip motion to keep the vehicle on the road, whereas the latter is intended to control the vehicle's roll motion to prevent vehicle divergence.

ESC systems have recently been enhanced to include a hill hold control feature that prevents a vehicle from unintentionally rolling backward on hill starts. To do this, brake pressure can be automatically maintained or an auxiliary clutch can be engaged to prevent the vehicle from rolling backward until the driver presses the accelerator or applies a certain pressure to the accelerator. Existing hill hold control systems are disclosed, for example, in Bosch's ESPlus® product and in U.S. Pat. No. 6,616,572.

U.S. Pat. No. 6,616,572 discloses that inputs to the system for hill hold control include a grade judging means, a shift gear train detecting means, and a foot brake operation detecting means. The grade judging means is disclosed to detect signals from a gear shift position sensor, a vehicle speed sensor, an acceleration sensor, and an input and output shaft rotation speed sensor, or to make a judgment based on a signal from an incline angle sensor.

Bosch's ESPlus® product can determine hill hold conditions when a vehicle is stopped, but may be less dependable or capable when the vehicle is moving or driving, particularly on a curved and hilly road, because hill grade is indirectly estimated through, for example, the longitudinal acceleration and the vehicle's reference velocity. Such an estimation can be inaccurate when a vehicle is dynamically driven on a curved and hilly road, where the vehicle's lateral velocity and yaw rate are both high.

Typical ESC sensor clusters include a lateral accelerometer and a yaw rate sensor. A longitudinal accelerometer can be added for four-wheel-drive vehicles. Typical RSC sensor clusters include a roll rate sensor in addition to the sensors provided in ESC clusters. Therefore, two angular rate sensors and two accelerometers are provided in RSC sensor clusters.

SUMMARY

The present invention may address one or more of the above-mentioned issues. Other features and/or advantages may become apparent from the description which follows.

Certain embodiments of the invention provide a vehicle stability control system comprising a 5-sensor cluster and a stability controller configured to communicate with the 5-sensor cluster and receive therefrom a lateral acceleration, a longitudinal acceleration, a yaw rate, a roll rate, and a pitch rate from the 5-sensor cluster. The stability controller can also be configured to determine a braking amount or a throttle amount to maintain vehicle stability. The system can also comprise a brake controller configured to communicate with the stability controller and receive a braking request from the stability controller, and a throttle controller configured to communicate with the stability controller and receive a throttle request from the stability controller.

Certain embodiments of the invention alternatively or additionally provide a method for performing hill hold control, the method comprising receiving a lateral acceleration, a longitudinal acceleration, a yaw rate, a roll rate, and a pitch rate, calculating a vehicle pitch angle from the lateral acceleration, the longitudinal acceleration, the yaw rate, the roll rate, and the pitch rate, calculating a road grade from the vehicle pitch and roll angles, and determining whether to apply brakes of a vehicle based on the road grade, a vehicle speed or wheel speeds, a transmission status, a throttle input, and a brake status.

Certain embodiments of the invention alternatively or additionally provide a method for maintaining a driver's intended speed of a vehicle during hill driving, the method comprising receiving a lateral acceleration, a longitudinal acceleration, a yaw rate, a roll rate, and a pitch rate, calculating a vehicle pitch angle from the lateral acceleration, the longitudinal acceleration, the yaw rate, the roll rate, and the pitch rate, calculating a longitudinal velocity gradient from the vehicle pitch angle and the longitudinal accelerometer measurement, and determining whether the longitudinal velocity gradient is substantially the same as a driver's intended value, and if the longitudinal velocity gradient is not substantially the same as a driver's intended value, changing a throttle input of the vehicle to change the vehicle's velocity.

Certain embodiments of the invention alternatively or additionally provide a method for maintaining a constant speed for a vehicle, the method comprising receiving a lateral acceleration, a longitudinal acceleration, a yaw rate, a roll rate, and a pitch rate, calculating a vehicle pitch angle from the lateral acceleration, the longitudinal acceleration, the yaw rate, the roll rate, and the pitch rate, calculating a longitudinal velocity gradient from the vehicle pitch angle, and maintaining the longitudinal velocity gradient as close to zero as possible.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF VARIOUS EXEMPLARY EMBODIMENTS

Reference will now be made to various embodiments, examples of which are illustrated in the accompanying drawings. However, these various exemplary embodiments are not intended to limit the disclosure. To the contrary, the disclosure is intended to cover alternatives, modifications, and equivalents.

Addition of a pitch rate sensor to an RSC sensor cluster can allow reliable and direct computation of a vehicle pitch angle. Vehicle pitch angle can be translated to determine road grade experienced by a driven vehicle, leading to a reliable and dependable differentiation between inclined/declined driving surfaces and level driving surfaces.

Figure 1:
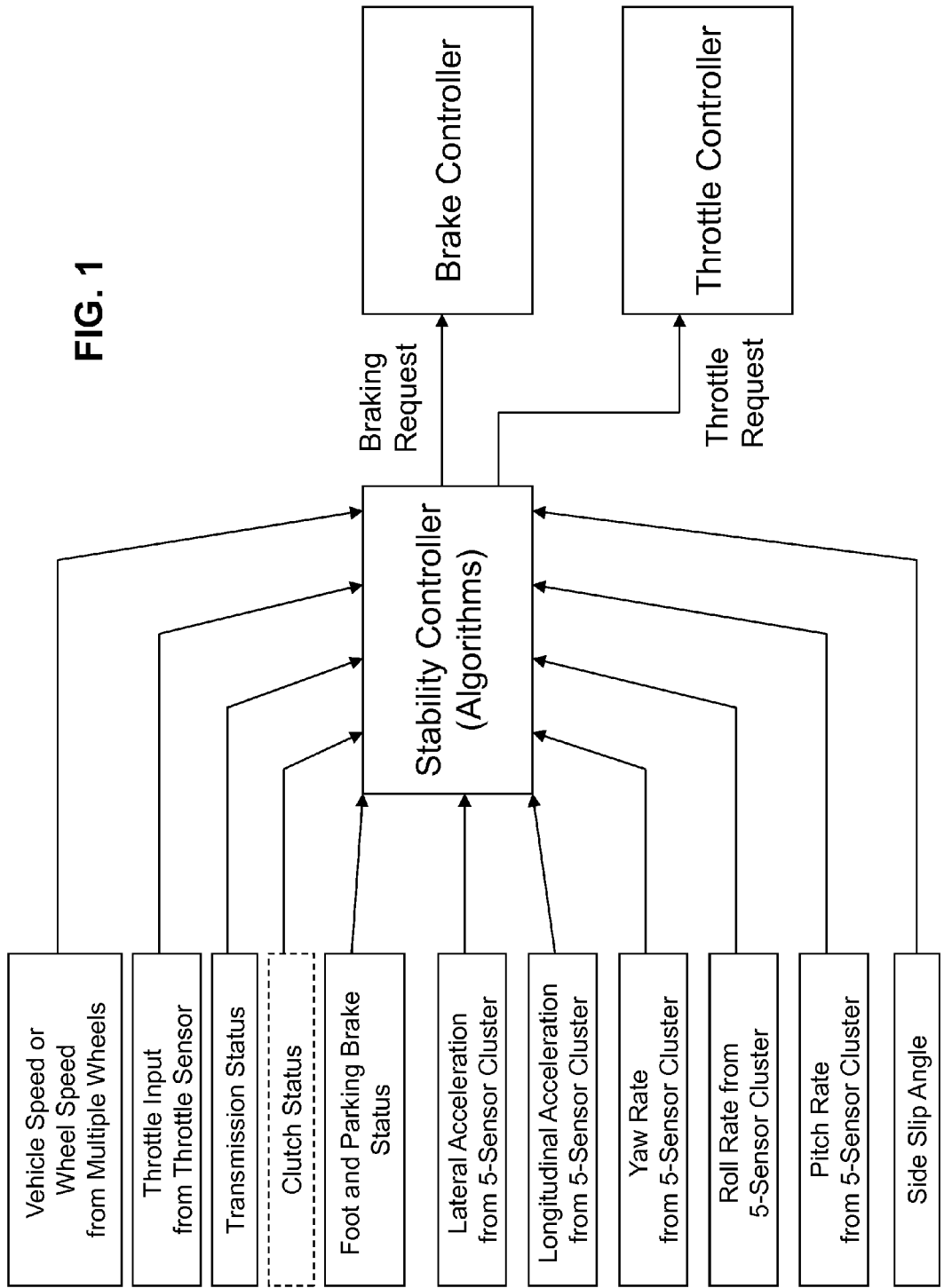
FIG. 1 illustrates 5-sensor inputs and other inputs to the stability controller in accordance with exemplary embodiments of the present teachings.

The present teachings contemplate enhancing vehicle stability control to achieve hill hold control, hill speed maintenance functions, and loss-of-control accident mitigation on a low p surface using a 5-sensor cluster that can interact with a vehicle brake controller. Road grade information is determined and utilized to command brake controls. A 5-sensor cluster for use in the present teachings can include, for example, a longitudinal accelerometer, a lateral accelerometer, a roll rate sensor, a yaw rate sensor, and a pitch rate sensor. As an alternative to a 5-sensor cluster, a 6-sensor inertial measurement unit (IMU) sensor can be employed in accordance with the present teachings. The sensor inputs are illustrated in FIG. 1. An IMU is a single-unit electronic module that collects angular velocity and linear acceleration data. An IMU housing typically contains two separate sensors. A first sensor is an accelerometer triad that generates three analog signals describing the accelerations along each of its axes produced by, and acting on a vehicle (i.e., lateral acceleration, longitudinal acceleration, and vertical acceleration). The second sensor is an angular rate sensor triad that outputs three analog signals describing the vehicle angular rate about each of the sensor axes (i.e., roll rate, pitch rate, and yaw rate).

Hereinafter, the term "5-sensor cluster" can include, for example, an RSC sensor cluster with an additional pitch rate sensor, an IMU sensor cluster, or an IMU sensor cluster with the vertical accelerometer removed. The vehicle's pitch angle is determined based on input from a 5-sensor cluster. Data from these sensors can be collected by a processor such as an IMU microprocessor before being sent to a controller on the vehicle, such as, for example, a stability controller, for determining whether backsliding or back rolling is occurring, and whether the vehicle speed matches the drivers intended speed when driving on inclines or declines, when combined with other data indicative of the driver's intended speed, such as throttle input. Throttle input is typically measured by throttle position. An engine torque command can be calculated based on a throttle position initiated by the driver.

Vehicle state information obtained using a 5-sensor cluster, which includes a road grade determination, allows a system of the present teachings to provide enhanced vehicle stability including hill hold control even when the vehicle is moving, e.g., ascending or descending a winding hill and preventing vehicle sliding on wet and other low-friction surfaces. To detect loss of control of a vehicle due to sliding on a low-friction surface such as a wet surface, the vehicle's longitudinal velocity gradient—from a pitch-compensated longitudinal acceleration—is compared with a reference speed computed from wheel speed sensors inputs, such as those used in ABS algorithms. While the former is a signed value, the latter is an unsigned value. Therefore, the former can differentiate reverse vehicle travel from forward vehicle travel, while the latter cannot differentiate opposing directions of vehicle travel. Recognizing loss of control of a vehicle on a low-friction surface can also require a sideslip angle value. Loss of control of a vehicle on a low-friction surface can be indicated by a small forward speed or a small/large reverse speed, together with a significantly large sideslip angle.

When a vehicle is sliding into loss of control, it is typically desirable to stop the vehicle as soon as possible using, for example, 4-wheel ABS braking or braking the vehicle via individual braking such that tire forces caused by braking are oriented in an opposite direction from a sliding velocity vector (which is determined from the values of the vehicle's longitudinal and velocity). In this way, a kinematic energy of the vehicle due to loss of control can be reduced to mitigate a secondary crash.

Using input from a 5-sensor cluster, a dynamic pitch angle of a vehicle can be calculated and used to estimate a grade of the road on which the vehicle is traveling, even when a vehicle is turning on a hilly road. Dynamic pitch angle $\theta_y$ of a vehicle, determined from measurements from a 5-sensor cluster, is an indication of an angular position of a vehicle body relative to the horizontal or sea level. By removing the vehicle's pitch angle $\theta_{yr}$ due to its suspension movement (referred to as chassis pitch angle or relative pitch angle (see U.S. Pat. No. 6,556,908)), the instantaneous road grade $\theta_{yroad}$ can be determined as $\theta_{yroad} = \theta_y - \theta_{yr}$.

Using a longitudinal acceleration measurement, the vehicle's pitch angle is determined as follows:

$$\theta_y = \frac{a_x - \dot{v}_{xref} + \omega_z v_y}{g} \qquad (1)$$

where $a_x$ is the output of the longitudinal accelerometer in the 5-sensor cluster, $\dot{v}_{xref}$ is the time derivative of the longitudinal velocity $v_x$ of the vehicle, $\omega_z$ is the output of the yaw rate sensor in the 5-sensor cluster, $v_y$ is the lateral velocity of the vehicle defined on the lateral axis of the sensor cluster, and g is gravity. $v_x$ can be a variable estimated based on the wheel speed sensor signals and the other computed signals used in brake controls. It is heavily influenced by the tire rolling radii (see, for example, U.S. Pat. Nos. 6,915,193 and 6,847,875). $v_y$ is also an estimated variable (see, for example, U.S. Pat. No. 6,725,140).

In current ESC sensor systems, since there is not enough information to determine $v_y$, the above pitch computation is simplified as $$\theta_y = \frac{a_x}{g} \qquad (2)$$

which is good indication of the vehicle pitch if the vehicle is stopped (i.e., $\dot{v}_{xref}=0$ and $\omega_z=0$). In circumstances where a vehicle is driving on a hilly road, for example, with 0.5 rad/sec yaw rate at 45 mph and a 5 degree sideslip angle, using the above computation introduces at least 5 degrees of error in the pitch estimation. Given the potential errors in $v_x$, the error in the pitch computation in equation (2) above will be even larger.

Road grade can be determined using the global or dynamic pitch angle of the vehicle (or, more precisely, the pitch angle of the vehicle's sensor frame) and then accounting for (e.g., subtracting) relative pitch angle of the vehicle to determine the road grade. Relative pitch angle is a suspension-caused pitch angle and road grade is an average road surface angular position with respect to sea level. In dynamic events that put a longitudinal force on the vehicle (e.g., braking, acceleration, steering, etc.), a relative angle can be caused to exist between the vehicle's horizontal plane and the grade of the road on which the vehicle is traveling. When a vehicle is in steady state, the vehicle's horizontal plane and the grade of the road on which the vehicle is traveling can be assumed the same. Determination of the pitch angle of the vehicle (the vehicle body angular position with respect to sea level) is described in U.S. Pat. Nos. 7,222,007 and 7,239,949 as a determination of global pitch, the entire disclosures of which are incorporated herein by reference. Determination of relative pitch, or suspension-caused pitch, is described in U.S. Pat. No. 6,556,908, the entire disclosure of which is incorporated herein by reference.

In certain embodiments of the present teachings, the vehicle pitch angle is received or calculated by the stability controller, for example in its state estimator, which determines road grade and also receives other inputs such as the vehicle speed or wheel speeds at multiple wheel locations, lateral acceleration, longitudinal acceleration, yaw rate, and sideslip angle. These inputs and their possible sources are illustrated in the exemplary embodiment of FIG. 1. In accordance with certain embodiments of the present invention, the stability controller can estimate and predict vehicle operation states relevant to the present teachings as described in U.S. Pat. Nos. 7,222,007 and 7,239,949, for example by applying various algorithms. It is to be understood, as set forth below, that a dedicated controller can receive the sensor inputs and estimate and predict vehicle state in accordance with the present teachings, or a distributed computation of various subsets of the estimation and prediction of vehicle state can be utilized.

In accordance with various embodiments of the present teachings, determination of road grade can be performed by a vehicle stability controller, such as a state estimator embedded in an RSC controller. Control of vehicle braking for identified scenarios such as backsliding, backward rolling, and sliding into loss of control can be accomplished, in response to a road grade determination and other sensor inputs, using the same controller or a separate controller such as, for example, an RSC brake controller. The present teachings also contemplate a dedicated controller for determining road grade and/or for determining an amount of vehicle braking to be performed to maintain stability in accordance with the present teachings, or a distributed computation of various subsets of the determination of road grade and/or an amount of vehicle braking to be performed to maintain stability in accordance with the present teachings. Calculating road grade and an amount of vehicle braking to be performed to maintain stability in the same controller/module that actuates the braking may enhance performance of the overall vehicle stability control system described herein. In accordance with certain embodiments of the present teachings, the system continuously monitors sensor inputs to prevent backward rolling in hill holds, and determine and maintain a driver's desired speed during, for example, mountain driving and braking a vehicle to counteract vehicle sliding during a loss-of-control scenario.

On dry roads, a vehicle may experience backward rolling when a driver begins driving and the transmission does not properly and timely engage. Certain embodiments of the present teachings contemplate using road grade, wheel speeds, a longitudinal velocity gradient (a pitch-compensated longitudinal acceleration), a transmission status, past vehicle state information, foot and parking brake status, and clutch status for a manual transmission when available, to detect backward rolling. If dual-direction wheel speed sensors are used, backward rolling detection can be achieved by simply checking whether the wheel speed sensors indicate such backward rolling.

On a low-friction (e.g., wet or icy) road, a vehicle may experience significant sideslip even if ESC is engaged. During such a sideslip, a driver can lose control of a vehicle and the vehicle may end up backsliding or sliding in another direction. Certain embodiments of the present invention contemplate using road grade, wheel speed, sideslip angle, and the vehicle's longitudinal velocity gradient to detect backsliding.

If the system detects backsliding or backward rolling due to driving on a graded road or sliding into loss of control on a hilly or relatively flat surface, the vehicle's braking system can be employed to prevent backsliding or rolling by conducting 4-wheel braking, for example including ABS braking, to stop the vehicle as quickly as possible. A timely stop of a backsliding vehicle can prevent accidents from occurring and can help reduce any influence from possible driver panic actions. Braking can be activated as soon as backsliding or backward rolling is detected when the vehicle is not in reverse gear on a hill. Sufficient brake pressure can be deemed to have been applied when a vehicle's wheels have stopped, and can be alleviated when the driver is pressing the vehicle's brake or throttle to a suitable degree.

In addition to hill hold control, the present teachings contemplate using a vehicle's longitudinal velocity gradient to conduct vehicle speed control during hill driving. For example, by providing the vehicle's longitudinal velocity gradient to a controller such as a braking controller or an engine controller, a constant or intended speed of the vehicle during hill ascent and hill descent can be achieved—proactively rather than reactively. During hill driving, a sensed longitudinal acceleration will always include a gravity influence and feedback control regulating the vehicle's longitudinal acceleration will therefore be erroneous. Constant or intended speed is maintained during inclined or declined driving by factoring out the effect of gravity (i.e., the erroneous readings that it causes from the longitudinal acceleration sensors) using the longitudinal velocity gradient. Because here the target speed of the vehicle is not needed, longitudinal velocity gradient regulation provides a flexibility to maintain a vehicle's speed as it existed immediately prior to the vehicle enters into a control condition.

Using a pitch computation, the longitudinal velocity gradient or pitch-compensated longitudinal acceleration can be obtained during hill driving with the following equation:

$$\dot{v}_x = a_x - g \sin \theta_y \quad (3).$$

Thus, a vehicle's exact longitudinal velocity gradient can be determined from the vehicle's longitudinal acceleration, yaw rate, sideslip angle, and global pitch angle. Longitudinal velocity gradient removes the effect of gravity from a longitudinal acceleration reading. Therefore, determination of longitudinal velocity gradient can be used to obtain a true characterization of a vehicle's changing rate of speed.

In certain embodiments of the present teachings, to maintain a constant or intended speed on inclines and declines, braking and throttling can be used to prevent the vehicle from gaining undesired speed downhill or loosing too much speed uphill. Such vehicle speed maintenance can provide increased fuel economy for a vehicle, even when the vehicle is not traveling on an inclined surface.

During downhill driving, if road grade is deep enough for a coasting vehicle to maintain a certain speed, increasing throttle input would lessen fuel economy. To maintain or increase fuel economy, certain embodiments of the present teachings contemplate electronically controlling the throttle to override a driver's throttle input. In addition, if the vehicle is driving on a road having a road grade decline in a medium range, the driver's throttle can be adjusted to reflect the road grade to add a necessary minimum amount of fuel to move the vehicle. If the road grade decline is extreme, braking can be initiated to regulate the longitudinal velocity gradient.

In accordance with certain embodiments of the present teachings, during uphill driving, if the road grade is very large, the vehicle's traction control system can be permitted to quickly respond to a driver's throttle request to move a vehicle forward. If the road grade is large, the vehicle's cruise control system can initiate an control scheme that adapts to the road grade to regulate the vehicle's longitudinal velocity gradient. If the road grade is in a medium range, the normal cruise control can be used.

As illustrated in the exemplary embodiment of FIG. 1, if a vehicle state estimator (which, in the illustrated embodiment would be embedded in the stability controller) determines that the vehicle's throttle or brakes should be activated, for example to maintain a driver's intended speed during hill driving, a braking request can be sent to a braking controller and/or a throttle request can be sent to a throttle controller. While braking can be used to decrease vehicle speed, for example to a driver's desired speed or to prevent undesired backward rolling or backsliding, throttle control can be used to both increase and decrease a vehicle's speed, for example to maintain a driver's intended speed during hill driving. Certain embodiments of the present invention contemplate waiting for a driver to remove pressure from the throttle, indicating that he no longer wants to maintain or increase his speed, before taking control of the vehicle's throttle to decrease throttle input.

Figure 2:
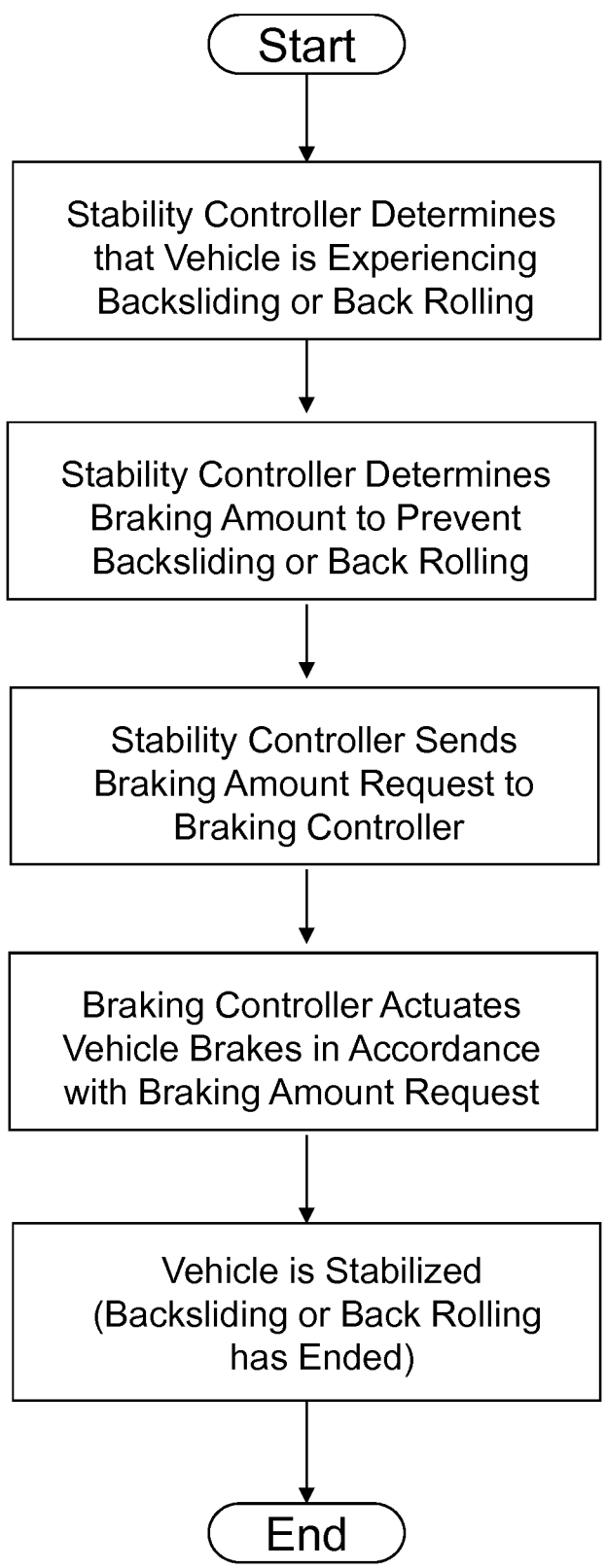
FIG. 2 is a logic flow diagram for preventing vehicle backsliding or backward rolling in accordance with exemplary embodiments of the present teachings.

FIG. 2 is a logic flow diagram for preventing vehicle backsliding or backward rolling (when reverse gear is not activated) in accordance with certain embodiments of the present teachings. As shown, the system monitors the above-described inputs to determine whether the vehicle is experiencing backsliding or backward rolling when the road grade detection indicates a hill driving situation. If backsliding or backward rolling is detected when the vehicle is driven on a graded road, the stability controller determines an appropriate braking amount to prevent backsliding or backward rolling. In accordance with certain embodiments of the present teachings, an appropriate amount of brake pressure can be calculated as proportional to the measured wheel speeds and/or the longitudinal velocity gradient as computed by brake controls and scheduled based on the magnitude of the road grade. The calculated appropriate amount of brake pressure can be sent as a braking amount request to the braking controller. The braking controller actuates the vehicle brake control system, in accordance with the braking amount request from the stability controller. Braking can be maintained until the vehicle is stabilized (e.g., backsliding, backward rolling, or loss of control due to sliding has ended) or the driver takes over control of the vehicle. For example, during inclined (uphill) driving, a driver requesting large throttle input during back sliding, backward rolling, or loss of control during sliding can cause the system to halt application of brake pressure.

Certain embodiments of the present teachings additionally contemplate preventing forward rolling of a vehicle during hill starts when a vehicle is parked facing down a hill such that a driver must start out in reverse gear to prevent forward rolling. Forward rolling in such a situation could only be permitted when a neutral or forward gear is engaged by the driver. One skilled in the art would understand, based on the above teachings, how such forward rolling prevention would be implemented.

Figure 3:
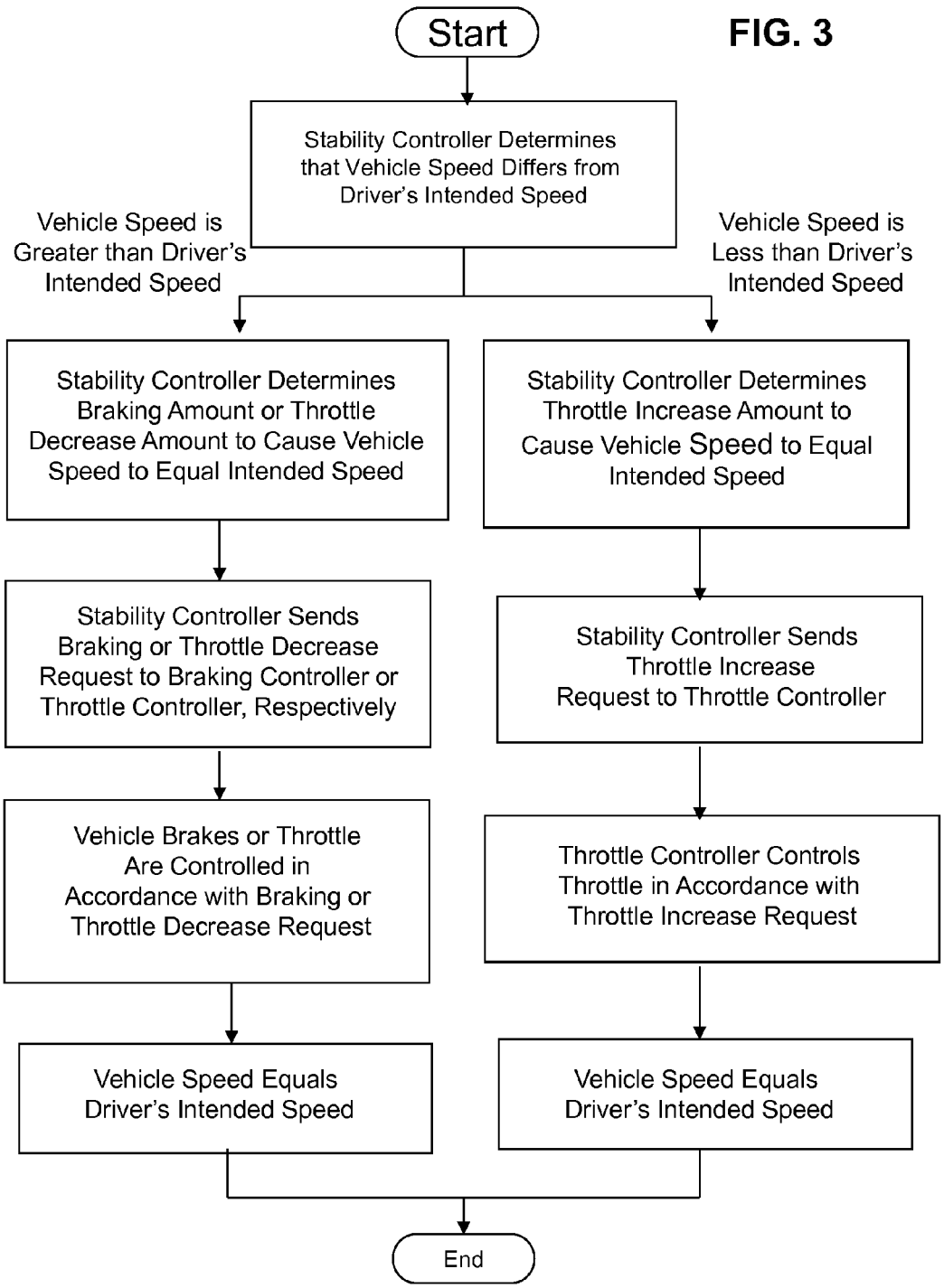
FIG. 3 is a logic flow diagram for maintaining a driver's intended vehicle speed in accordance with exemplary embodiments of the present teachings.

FIG. 3 is a logic flow diagram for maintaining a driver's intended vehicle speed in accordance with an embodiment of the invention. As shown, the system monitors the above-described inputs to determine whether the vehicle speed differs from the driver's intended speed. If the vehicle speed is substantially the same as the driver's intended speed, the stability controller or cruise control controller does not actuate vehicle braking or throttle systems. Whether the actual and intended speed of a vehicle are "substantially the same" for the purposes of the present teachings is application specific, and determined by applying an acceptable error range. If the vehicle speed is a certain degree greater than the driver's intended speed, for example because the vehicle is picking up speed while driving down a hill, the stability controller determines a braking amount that will slow the vehicle and cause the vehicle speed to equal the driver's intended speed, which can be measured as the vehicle speed immediately prior to the vehicle driving on a graded road. The stability controller sends the braking amount request to the braking controller. The braking controller actuates the vehicle braking system in accordance with the braking amount request from the stability controller.

As illustrated on the right-hand side of the logic flow diagram for the exemplary embodiment of FIG. 3, if the vehicle speed is a certain degree less than the driver's intended speed, for example because the vehicle is losing speed while driving up a hill, the stability controller determines a throttle increase amount that will increase the vehicle speed to equal the driver's intended speed. The throttle increase amount can be proportional to the difference between the driver's intended speed and the vehicle's actual speed. The stability controller sends the throttle increase amount request to the throttle controller, which can actuate the vehicle throttle in accordance with the throttle increase amount request from the stability controller.

To maintain a constant vehicle speed, thus increasing fuel economy, the longitudinal velocity gradient, such as that computed in equation (3), which is a signed value, is maintained as close to zero as possible by adjusting throttle input. The advantage of regulating the longitudinal velocity gradient is that the driver's intended speed does not need to be specified, because the system can automatically keep the vehicle speed as close as possible to the vehicle speed immediately prior to control activation. Thus, a cruise control type of scheme is not needed, although the present invention contemplates certain embodiments that may use a cruise control type scheme to initiate speed maintenance in accordance with the present invention.

While the present invention has been disclosed in terms of preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different restraint devices. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A vehicle stability control system, comprising:
   a 5-sensor cluster;
   a stability controller configured to communicate with the 5-sensor cluster and receive signals corresponding to a lateral acceleration, a longitudinal acceleration, a yaw rate, a roll rate, and a pitch rate from the 5-sensor cluster, the stability controller also configured to determine a braking amount or a throttle amount to maintain vehicle stability;
   a brake controller configured to communicate with the stability controller and receive a braking request from the stability controller; and
   a throttle controller configured to communicate with the stability controller and selectively and independently receive decrease throttle requests and increase throttle requests from the stability controller.

2. The vehicle stability control system of claim 1, wherein the stability controller is configured to receive signals corresponding to a sideslip angle, a vehicle longitudinal velocity, wheel speeds, a throttle input, a transmission status, and a brake status.

3. The vehicle stability control system of claim 2, wherein the stability controller is configured to receive signals corresponding to a clutch status.

4. The vehicle stability control system of claim 2, wherein the brake status includes a foot brake status and a parking brake status.

5. The vehicle stability control system of claim 1, wherein the stability controller comprises a state estimator.

6. The vehicle stability control system of claim 5, wherein the state estimator is configured to receive signals corresponding to the lateral acceleration, the longitudinal acceleration, the yaw rate, the roll rate, and the pitch rate from the 5-sensor cluster.

7. The vehicle stability control system of claim 6, wherein the state estimator is configured to determine road grade based on inputs from the 5-sensor cluster.

8. The vehicle stability control system of claim 7, wherein the state estimator is configured to use the road grade to determine whether the vehicle's throttle or brakes should be activated via the throttle request or braking request, respectively.

9. The vehicle stability control system of claim 1, wherein the stability controller is configured to detect a vehicle sliding into a loss of control.

10. A vehicle stability control system, comprising:
    a sensor cluster; and
    a state estimator configured to receive signals from the sensor cluster and to calculate a pitch angle of a vehicle based on the signals to determine a road grade of a road on which the vehicle is traveling,
    the state estimator being configured to selectively issue an increase throttle request to maintain vehicle stability based on the determined road grade.

11. The system of claim 10, wherein the state estimator is further configured to receive signals corresponding to a lateral acceleration, a longitudinal acceleration, a yaw rate, a roll rate, and a pitch rate from the sensor cluster.

12. The system of claim 10, wherein the state estimator forms part of a stability controller, wherein the stability controller is configured to receive signals corresponding to a sideslip angle, a vehicle longitudinal velocity, wheel speeds, a throttle input, a transmission status, and a brake status of the vehicle.

13. The system of claim 10, wherein the state estimator is further configured to selectively issue a decrease throttle request to maintain vehicle stability based on the determined road grade.

14. The system of claim 13, wherein the state estimator is further configured to selectively issue a decrease braking request or an increase braking request to maintain vehicle stability based on the determined road grade.

* * * * *